US009188362B2

(12) United States Patent
Potter, Sr. et al.

(10) Patent No.: US 9,188,362 B2
(45) Date of Patent: Nov. 17, 2015

(54) DIRECT FIRED HEATERS INCLUDING PREMIX BURNER TECHNOLOGY

(71) Applicant: Cambridge Engineering Inc., Chesterfield, MO (US)

(72) Inventors: Gary J. Potter, Sr., St. Charles County, MO (US); John P. Foley, Jr., St. Louis County, MO (US); Thomas J. Cleary, St. Louis County, MO (US); Marc D. Braun, St. Louis County, MO (US); Carl Schoenberg, St. Louis County, MO (US); John H. Kramer, Jr., St. Louis County, MO (US)

(73) Assignee: CAMBRIDGE ENGINEERING INC., Chesterfield, MO (US)

(*) Notice: Subject to any disclaimer, the term of this patent is extended or adjusted under 35 U.S.C. 154(b) by 0 days.

(21) Appl. No.: 14/165,228

(22) Filed: Jan. 27, 2014

(65) Prior Publication Data

US 2014/0209086 A1    Jul. 31, 2014

Related U.S. Application Data

(60) Provisional application No. 61/757,192, filed on Jan. 27, 2013.

(51) Int. Cl.
*F24H 3/06* (2006.01)
*F24H 3/04* (2006.01)
*F24H 9/20* (2006.01)

(52) U.S. Cl.
CPC ............ *F24H 3/0488* (2013.01); *F24H 9/2085* (2013.01)

(58) Field of Classification Search
CPC .................................................... F24H 3/0488
USPC ............................... 126/110 B, 110 C, 110 R
See application file for complete search history.

(56) References Cited

U.S. PATENT DOCUMENTS

| | | | | |
|---|---|---|---|---|
| 3,820,943 | A | * | 6/1974 | De Lancey .................... 431/265 |
| 4,750,452 | A | * | 6/1988 | Trihey ............................. 122/24 |
| 4,790,744 | A | | 12/1988 | Bellet et al. |
| 5,083,918 | A | | 1/1992 | Potter et al. |
| 5,195,884 | A | | 3/1993 | Schwartz et al. |
| 5,238,395 | A | | 8/1993 | Schwartz et al. |
| 5,429,112 | A | | 7/1995 | Rozzi |
| 5,642,724 | A | * | 7/1997 | Raleigh ...................... 126/350.1 |
| 5,984,663 | A | | 11/1999 | Joyce |
| 6,192,688 | B1 | | 2/2001 | Beebe |
| 6,729,874 | B2 | | 5/2004 | Poe et al. |

(Continued)

FOREIGN PATENT DOCUMENTS

| | | |
|---|---|---|
| CA | 2776289 | 4/2011 |
| EP | 0990854 A2 * | 5/2000 |
| FR | 2584800 A1 * | 1/1987 |

OTHER PUBLICATIONS

Industrial Burners Handbook, Baukal, 2004.*

(Continued)

*Primary Examiner* — Kenneth Rinehart
*Assistant Examiner* — Gajanan M Prabhu
(74) *Attorney, Agent, or Firm* — Harness, Dickey & Pierce, P.L.C.

(57) ABSTRACT

According to various aspects, exemplary embodiments are disclosed of direct fired heaters including premix burner technology and/or feed forward control loop modulation via inlet air temperature.

33 Claims, 5 Drawing Sheets

(56) References Cited

U.S. PATENT DOCUMENTS

| | | |
|---|---|---|
| 8,333,584 B2 | 12/2012 | Cook |
| 2005/0051155 A1 | 3/2005 | Tomlinson et al. |
| 2010/0310998 A1 | 12/2010 | Raleigh et al. |
| 2011/0146652 A1* | 6/2011 | Kovacs ..................... 126/116 R |
| 2014/0099589 A1* | 4/2014 | Ploof et al. ...................... 432/21 |

OTHER PUBLICATIONS

Industrial Combustion Testing, 2011.*

Premix Burners, William Raleigh, 2008 National Technical Conference, American Society of Gas Engineers.*

The E•Series AbsolutAire; Direct-Fired Air Turnover Solution; Dec. 2009; www.absolutaire.com; 12 pages.

http://www.taylorboiler.com/product_descriptions/default.html; Jan. 25, 2013; Taylor Boiler & Equipment Co.; 5 pages.

E-Series Direct-Fired Air Turnover System/AbsolutAir; http://www.absolutaire.com/products/e-series; Jan. 25, 2013; 1 page.

Hayward Pool Equipment/Houston Pool Builder; http://www.elitepoolsofhouston.com/equipment; Jan. 25, 2013; 1 page.

E Series Sample Specification for Absoluteair, Inc. E-Series Product Line; Revision Apr. 1, 2009a; 7 pages.

Canadian Office action dated Oct. 30, 2014 for Canadian Patent Application No. 2,867,337 which claims priority to the same parent application as the instant application, 8 pgs.

International Search Report and Written Opinion for PCT Application No. PCT/US2014/013190 which claims priority to the same parent application as the instant application; dated May 8, 2014; 7 pages.

* cited by examiner

DIRECT FIRED HEATERS INCLUDING PREMIX BURNER TECHNOLOGY

CROSS-REFERENCE TO RELATED APPLICATION

This application claims the benefit and priority of U.S. Provisional Patent Application 61/757,192 filed Jan. 27, 2013. The entire disclosure of the above application is incorporated herein by reference.

FIELD

The present disclosure generally relates to direct fired heaters, which may include premix burner technology.

BACKGROUND

This section provides background information related to the present disclosure which is not necessarily prior art.

Direct gas-fired heaters have been manufactured for over 50 years to serve industrial and commercial facilities. In direct fired commercial heaters, circulation air and products of combustion are vented directly into the space being heated, unlike indirect fired heaters that vent combustion products to the outdoors. Direct gas-fired heaters are primarily intended for space heating applications in commercial and industrial facilities to address the heat load and ventilation requirements of these facilities.

The most common use for a direct fired heater is to replace air that is being exhausted as part of a process. When used for this purpose, direct fired heaters are commonly referred to as make-up air heaters. Typically, a make-up air heater is provided to the marketplace in a draw-through heater configuration to meet customer demand for a constant airflow output, e.g., in cubic feet per minute (cfm), that matches the exhaust airflow capacity.

In a draw-through design or configuration, outside air first passes over a line burner before entering a centrifugal blower. The blower is located downstream of the line burner and operates to draw outside air through or over the line burner. The blower in this draw-through arrangement is a "constant volume machine" which indicates that the air volume delivered by the blower to the space is relatively constant as it handles air over a fairly narrow range of outlet temperatures.

Make-up air heaters normally discharge air at or slightly above the desired room temperature. Energy efficiency may be optimized by neutralizing the impact of exhausting air out of a building and replacing it with a heating system that converts all of the sensible heat contained in the gas to heat the outside air that replaces that which was exhausted by the process. The moisture from the combustion process is discharge in the space, which adds to the comfort level of the occupant as the outside air tends to be very dry in the fall and winter months when heat is needed most. Because the moisture derived from the combustion process is not condensed, the overall system efficiency of these types of direct fired make-up air heaters are recognized to be approximately 92% efficient. The inventors hereof have recognized, however, that without the air being provided by the direct fired make-up air heater in a controlled manner, air would enter the building through openings that are part of the building structure in the form of infiltration air. Air that infiltrates a building is untempered air (not preheated), which results in cold drafts and uncomfortable working conditions especially for personnel working in the dock areas where open doors become the pathway of choice for the infiltration air.

Direct gas-fired heaters have also been marketed for over 50 years with a blow-through heater configuration in which the blower is upstream of the burner. More specifically, the blower is located to handle outside air and blow the outside air past a burner, which is operable for heating the outside air before it is discharged into the space to be heated.

But the inventors hereof have recognized that direct fired blow-through heaters are not well suited for exhaust air applications because cold outside air will expand after it passes over the burner as a function of the change in air density. By way of example, air at 0° F. and having an air density of 0.08635 pounds per cubic foot (lbs/ft$^3$) heated to 70° F. after it passes the burner results in an expansion of that air and a lowering of the air density to a value of 0.075 pounds per cubic foot. This, in turn, results in an increase in the airflow being discharged by the heater of 15.1%. If the exhaust application was a kitchen hood in a restaurant, the excess supply air may have a negative impact on the kitchen hoods ability to extract the smoke and odor for the cooking process, which could also impact the remaining public areas of the facilities.

Direct fired blow-through heater configurations are well suited for use as space heaters. In this case, a direct blow-through heater may be applied to address the heat load of a facility and not to match a given exhaust application. Industrial and commercial buildings have an infiltration load element as part of its heat load as a result of wind and temperature differences between indoor and outdoor temperatures. Based on ASHRAE (American Society of Heating, Refrigeration, and Air-Conditioning Engineers) ventilation requirements, it is often necessary to provide a source for this ventilation requirement as well as which can be met by this same heater.

In some well insulated buildings, the infiltration element of the heat load analysis can show that the infiltration load and the load associated with the ventilation requirement is more significant than the conduction load. In these applications, the optimization of a heating system occurs when the system first addresses and matches the combination of infiltration load and ventilation load on a designated day and then checks to verify that the conduction load requirement has also been addressed. When a direct fired heater is utilized for space heating, that portion of the heater's capacity that heats the outside air temperature to room temperature is directly tied to the infiltration and ventilation heat load. That portion of the heater capacity above room temperature and the maximum temperature rise of the heater is applied to the conduction load with any extra capacity also being applied to the any infiltration and ventilation heat load remaining, if required. There is a significant system efficiency advantage if the blow-through heater is capable of obtaining a temperature rise equal to or greater than the maximum discharge temperature allowed by the ANSI (American National Standards Institute) Standard Z83.4 for Non-Recirculating Direct Gas-Fired Industrial Air Heaters. ANSI Standard Z83.4 sets the maximum discharge temperature at 160° F. and limits the maximum temperature rise to 190° F. In an application where the minimum design for a location is 0° F. (e.g., like Saint Louis, Mo., etc.), a heater with a temperature rise of 160° F. would therefore optimize the heater selection for that location.

Another benefit of a direct fired blow-through space heater configuration is that a space heater is generally cycled on and off based on a call for heat by a room thermostat. A conventional draw-through make-up air heater will run continuously as long as the exhaust fan is operating. During the operating time of a space heater, the heater airflow tends to neutralize the flow of infiltration air into the building as a result of the air brought in by the heater escaping out of the same cracks. This exhale of the air supplied by the heater carries out other contaminants that may be created in the building. If the infiltration rate of the building is too low, additional relief openings may be required to meet the minimum ventilation requirements of the facility.

Since the products of combustion in both draw-through heaters and in blow-through heaters are released into the heated air stream, it is important the levels of these combustion products (carbon monoxide (CO), nitrogen dioxide ($NO_2$) and carbon dioxide ($CO_2$)) be controlled by the burner design to meet the levels identified by the ANSI Standard for these products. ANSI Standard Z83.4 covers both configurations of heaters (blow-through and draw-through) and limits the CO rise through the heater to no more than 5.0 parts per million (ppm). In comparison, OSHA (Occupational Safety and Health Administration) indicates the maximum exposure for an 8 hour period for the occupants of a building. If propane fork trucks are utilized in the facility, the combustion products generated by the fork trucks is additive to the environment. And, additional ventilation provided by the operation of these space heaters is required to purge that contamination from the building. It is generally recognized that 5,000 cfm of ventilation air is required per operating and well-tuned fork truck to keep contaminants from approaching undesirable levels.

The $NO_2$ rise through the heater is limited to 0.5 ppm, and $CO_2$ is limited to 4,000 ppm for these heaters by ANSI Standard Z83.4. $CO_2$ production is solely a function of the type of gas utilized (natural gas or propane) and the temperature rise based on a mathematical relationship ($CO_2 = 19.63 \times K \times Temp$ Rise, where K=1.04 for natural gas and 1.206 for propane). $NO_2$ like CO is a function of the burner design and generally limits the maximum temperature rise that the direct fired heater can achieve during certification testing for the burners that have been utilized in these types of heaters for many years. OSHA limits the short term exposure limit (STEL) of $NO_2$ to 5 ppm, which allows for only a 15 minute timeframe. This ANSI Standard Z83.4 for direct fired heaters limits the combustion products to protect the health of the occupants within the space. It does not in any way limit the emissions based on their impact on the environment as it relates to compounds that contribute to the creation of smog and greenhouse gases. Nitrogen oxides (NOx) are recognized as a major contributor to both smog and greenhouse gases. Although the NOx emission for the existing technology of burner design is far from what may be considered as "Low NOx", the operating efficiency of the direct fired heater lessens the impact of the total annual production of NOx compared to gas appliances that have lower operating efficiencies with lower NOx emission levels. Typically, the emission level of the existing burner technology has run between 55 ppm and 65 ppm at 3% oxygen ($O_2$).

The South Coast Air Quality Management District (SCAQMD) has long been recognized as the leader in establishing the greenhouse gas emissions limits for gas utilization equipment by providing Rules for each type of appliance. Their primary focus has traditionally been on limiting the annual output of nitrogen oxides (NOx). By establishing NOx limits on an appliance category, this organization pushes the envelope of innovation by the equipment manufacturers. Their Rules apply to the localized areas around Los Angeles encompassing five adjoining counties. The 35 other Air Quality Management Districts in California continuously monitor SCAQMD activities and the results, and soon follow the lead of SCAQMD.

When SCAQMD first addressed large boilers, SCAQMD established a Rule for NOx emissions at 30 ppm at 3% $O_2$. After manufacturers discovered technology improvement that consistently lowered their NOx emission results, SCAQMD revised the Rule to lower the allowable limit to 20 ppm at 3% $O_2$ which continued to drive innovation. Eventually, these technological improvements led to the NOx emissions being lowered to 9 ppm at 3% $O_2$ which is considered as ultra-low NOx. SCAQMD has focused on the largest sources of greenhouse gas emission in their efforts to reduce the smog in the immediate area around Los Angeles. As the air quality continued to improve, SCAQMD gradually shifted their focus to the smaller NOx generation sources.

SUMMARY

This section provides a general summary of the disclosure, and is not a comprehensive disclosure of its full scope or all of its features.

According to various aspects, exemplary embodiments are disclosed of direct fired heaters including premix burner technology and/or feed forward control loop modulation via inlet air temperature.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure FIG. 1 is a perspective of a direct fired heater with premix burner technology according to exemplary embodiments;

Figure 4:
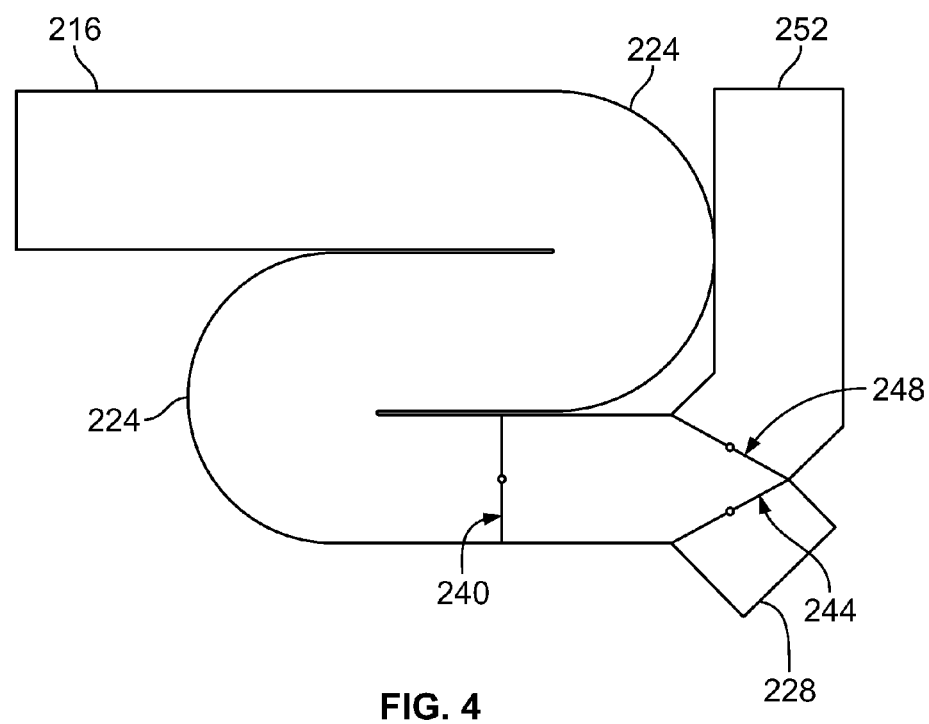
FIG. 4 is a side view of ductwork and dampers that may be used in a direct fired heater for redirecting air during the fresh air purge and ignition cycle to avoid cold drafts and gas odor on startup according to exemplary embodiments, where the dampers are shown in a closed position when the direct fired heater would be off.
Figure 6:
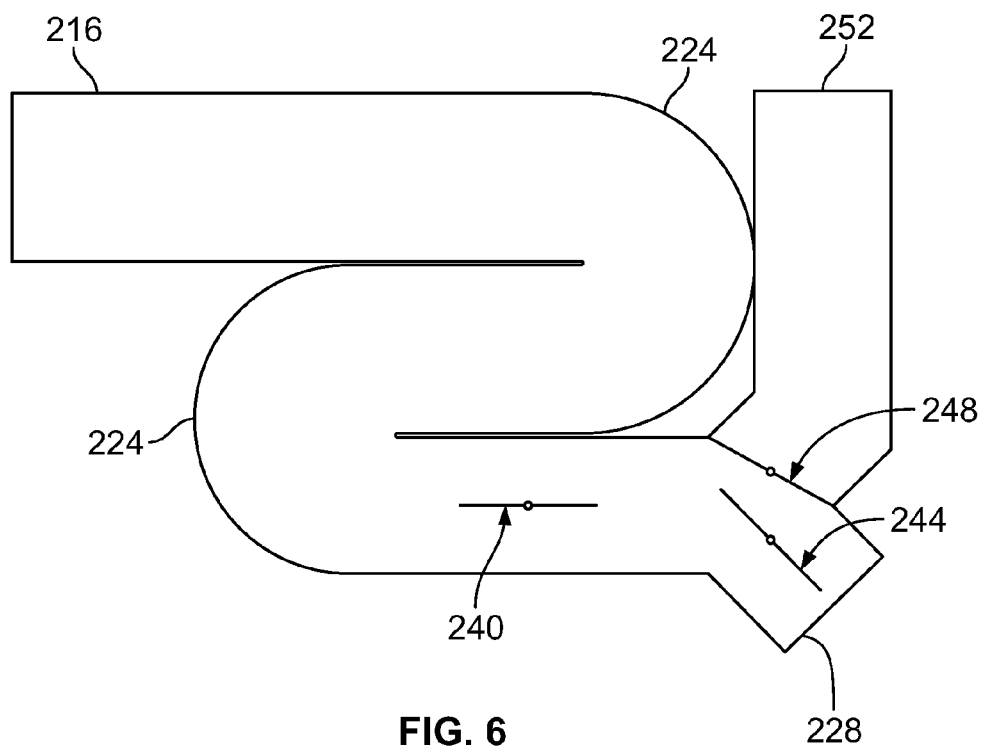
Figure 7:
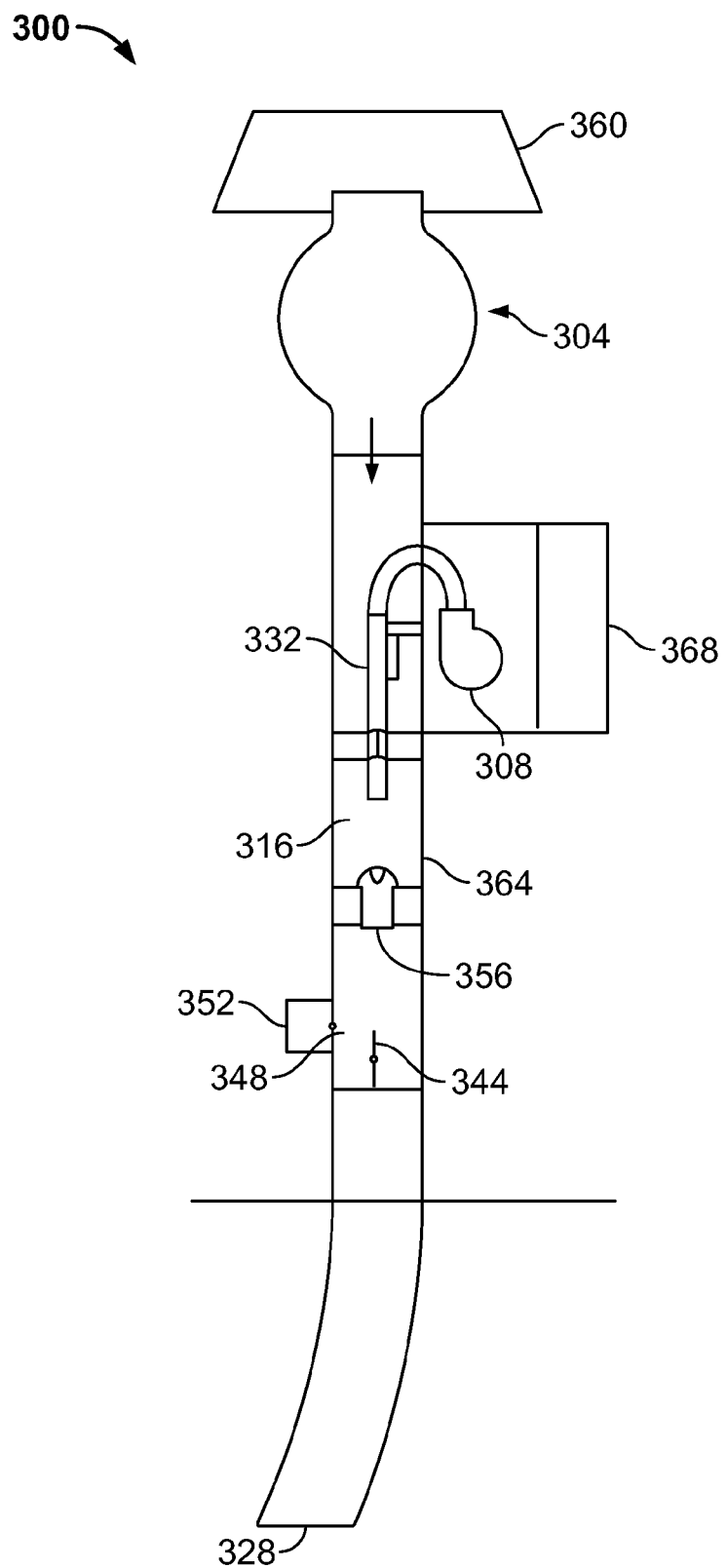

FIG. 6 is a side view of the ductwork and dampers of FIG. 4 where the dampers are shown in a discharge mode in which the bypass damper is closed but the primary damper and discharge damper are open to thereby allow heated air to be discharged into the space to be heated during operation of the direct fired heater; and FIG. 7 illustrates another exemplary embodiment of direct fired heater including mixing means to blend the temperature as circulating air passes through the ductwork, and a camera and view screen for flame observation.

DETAILED DESCRIPTION

Example embodiments will now be described more fully with reference to the accompanying drawings.

As noted above, the South Coast Air Quality Management District (SCAQMD) has long been recognized as the leader in establishing the greenhouse gas emission limits for gas utilization equipment by providing Rules for each type of appliance. On Jan. 1, 2010, SCAQMD Rule 1147 became effective and addressed other gas utilization equipment not previously covered by other published Rules. This expansion of coverage included direct fired heaters and limited NOx generation to 30 ppm at 3% $O_2$. Traditional burners cannot meet this requirement using the conventional technology currently used with direct fired heaters. As a result of the implementation of SCAQMD Rule 1147, direct fired heating products were frozen out of the marketplace in the localized areas around Los Angeles encompassing five adjoining counties that are governed by SCAQMD.

Accordingly, the implementation of SCAQMD Rule 1147 encouraged the inventors to pursue technologies and combustion solutions that could obtain NOx results below 30 ppm at 3% $O_2$ and thereby regain compliance with the requirements of Rule 1147. To this end, the inventors hereof developed innovative solutions using premix burner technology that address the challenges unique to direct fired heater applications. Accordingly, disclosed herein are exemplary embodiments of direct fired heaters including premix burner technology, which allows the direct fired heaters to comply with SCAQMD Rule 1147 and have NOx results below 30 ppm at 3% $O_2$. Although some exemplary embodiments disclosed herein are able to comply with SCAQMD Rule 1147 and NOx results below 30 ppm at 3% $O_2$, this is not required for all exemplary embodiments as some other exemplary embodiments may be configured differently such that they have NOx results equal to or higher than 30 ppm at 3% $O_2$.

By way of example, an exemplary embodiment of a direct fired heater having premix burner technology generally includes a zero governor gas valve design in conjunction with a premix combustion air blower. The premix combustion air blower has an inlet venturi that delivers a combustible gas mixture to one or more burner heads, which may have various configurations. Generally, the principle of premix is to provide sufficient air to theoretically consume all fuel that is being delivered for complete combustion. The combustion under this approach is referred to as having a stoichiometric fuel to air ratio.

In an exemplary embodiment, a direct fired heater includes an inlet air opening for the entry of fresh ventilation air. The air inlet is preferably directly connected to an outside air source. The direct fired heater includes a primary circulating air blower, which is operable for conveying outside air through outlet ducting in which the air absorbs heat generated from a separately heated air stream. The heat may be absorbed by the air in both a direct and indirect method of heat transfer such that the entirety of the sensible heat produced from this heater is transferred to the outside ventilation air stream. The air is then subjected to a mixing means to blend the temperature of the main air stream before it is expelled or discharged from the heater outlet to the confines or space of a building structure to be heated.

On the gas/burner section of the direct fired heater, a gas supply pipe assembly is provided to convey gas from a utility service line or gas distribution piping that has been routed to the heater for connection to a manual gas supply shut-off valve on the heater. The other end of the gas supply assembly is connected to an automatic gas shut-off valve assembly.

For heaters with gas capacities below 400,000 Btu/hr, two automatic shut-off valves may be provided within the body of a gas valve. The gas valve includes a zero governor regulator set to control the flow of gas in response to the speed of the combustion air fan as part of a premix combustion system.

The outlet of the gas valve assembly is connected through another pipe segment that contains a leak test port and a burner test firing valve, which is primarily used to confirm the gas tightness of the gas valve seat with respect to the passage of gas when the valve is not energized. The other end of this pipe segment terminates at a device referred to as a venturi. The venturi is a device attached to the inlet opening of the combustion air blower on the premix system. As combustion air passes through the venturi, it creates a negative pressure response that reflects the amount of combustion air being pulled into the venturi by the combustion fan. The level of the negative pressure is fed or directly transmitted back to the zero governor regulator in the gas valve assembly through the pipe segment between the venturi and the outlet of the gas valve assembly. The zero governor regulator may then immediately respond to neutralize the negative pressure by permitting the specific flow of gas to address what is needed to bring the pressure at the regulator back to a zero pressure state. By adjusting the gas flow with adjustment means provided on the venturi and needle screw adjustments supplied on the gas valve assembly, a stoichiometric relationship can be established over the full firing range of the heater in this premix system.

The speed of the fan is therefore the determining factor for the amount of fuel that flows in the system as it creates the negative pressure in the venturi that acts on the zero governor regulator. Once this relationship is established, it remains stable throughout the life of the heater. The combustion air fan delivers a homogeneous mixture of fuel and air to a burner head of the heater. The burner head is located on the opposite side of a bulkhead. The bulkhead separates the gas valve assembly and the combustion air fan assembly compartment from the outside ventilation air compartment and the outlet ducting section of the heater. The design of the burner head imparts a swirling pattern to the fuel-air mixture as the mixture passes through a membrane of the burner head into the firing tube. Ignition of the fuel-air mixture and flame presence are continually monitored by a flame safeguard control system by utilizing a flame detection sensor throughout the heating cycle.

The heater includes a fire tube, which comprise a non-insulated thermally conductive (e.g., metal, etc.) cylinder of sufficient length and diameter to permit all of the fuel-air mixture to be completely consumed before it reaches the end of the firing tube. The heat from combustion that is absorbed by the walls of the fire tube is transferred to the outside ventilation air stream as it passes alongside of the fire tube. With this heat transfer, the fire tube sufficiently cools to remain well below a temperature rating of the tube material. The heat from combustion that is not absorbed by the walls of the fire tube is dispelled out the end of the tube where it is then mixed with the outside ventilation air stream as indicated above.

The inventors hereof recognized and then resolved various issues unique to the direct fired heater application as part of their adoption and incorporation of premix burner technology. One of these issues is the temperature rating of the combustion air fan and the gas valve assembly. More specifically, the gas valve is rated for 20° F. while the combustion air blower is rated for −4° F. These temperatures are above the temperature rating of −40° F. that direct fired heaters are designed to meet.

To extend the temperature rating of the gas valve and combustion air blower which are part of the premix system, the inventors realized that supplemental heat is required along with means to isolate the gas valve and combustion air blower from the air stream of the main circulating air blower. In exemplary embodiments, the inventors accomplished the isolation by locating the combustion air blower and gas valve assembly in a separate compartment within the heater assembly.

A supplementary electric heat source may also be used in conjunction with a thermostatic switch to warm the valve/combustion air blower compartment during non-operational periods and outdoor ambient temperatures below 25° F. To provide supplementary heat during the heater's operating cycle, the firing tube is configured or modified to include a formed channel, which may be secured to the firing tube. This formed channel creates a physical pathway to the gas valve/combustion air blower compartment.

During operation, a small portion of the outside ventilation air is propelled or pushed through the channel in a counter flow direction compared to the main system flow. The air is pushed through the channel by static backpressure caused by restricting means provided in the path of the outside ventilation airflow as the air flows through the discharge ductwork to the heater outlet. As air is pushed though the formed channel, the air picks up heat from the fire tube surface and carries it to the gas valve/combustion air blower compartment to thereby provide supplementary heat, which may be based on a worst case outdoor design temperature for the heater whenever the heater is operating.

The formed channel is located in the section or portion of the fire tube where only indirect heat transfer is taking place. Therefore, the air supplied via the channel to the gas valve/combustion air blower chamber is free from any combustion products.

The formed channel pathway is sized based on discharge static pressure of the main circulating air blower and the cross sectional area of the formed channel to deliver the volume of combustion air required when the heater is operating at the maximum Btu/hr capacity. The premix system modulates the heater capacity to maintain the maximum discharge temperature of 160° F. because less combustion airflow is consumed as the outdoor ambient temperature increases above the outdoor design temperature.

Continuing with a description of this exemplary embodiment, the manner by which the heated bypass air is delivered to the gas valve/combustion air blower compartment avoids the complexity of having to modulate the bypass airflow in relationship to the speed of the combustion air blower. A means for air relief in the gas valve/combustion air blower compartment to avoid pressurizing the compartment as the combustion airflow requirement is reduced to its minimum point, which correlates to the minimum firing rate of the heater. If the gas valve/combustion air blower compartment were permitted to pressurize, the fuel to air mixture ratio could drift from the stoichiometric relationship. Though it is possible to properly adjust the stoichiometric relationship with the gas valve/combustion blower compartment sealed, the fuel to air ratio would be negatively impacted as a result of the pressure removal if the access door to this compartment is opened during heater operation.

A required provision identified in the ANSI Standard Z83.4 for Non-Recirculating Direct Gas-Fired Industrial Air Heaters is that the heater housing and any attached inlet ductwork must be purged for at least four air changes before attempting to ignite the burner. With conventional direct fired heaters, this purge results in non-tempered outside ventilation air being expelled from the heater for an extended time period in some cases in order to meet the four air change requirements. This cold draft is often viewed negatively by the occupants of the facility being heated. Thus, heater manufacturers have consistently attempted to minimize the inlet ducting so as to limit the purge to less than 10 seconds in order to minimize the discomfort of the occupants.

One of the benefits that may be realized by direct fired heaters with premix technology is that the gas capacity rating is substantially downsized permitting it to be applied to smaller buildings. The magnitude of the reduction of building size is dramatic as buildings as small as 800 square feet are possible where previously the smallest buildings in which a direct fired heater could be successfully applied approached 20,000 square feet. But the inventors have recognized that this also increases concern related to how the purge will impact the building occupants.

The inventors also recognized another issue that arises when implementing or using premix technology with direct fired heaters, specifically a gas odor experienced during the ignition sequence. In an indirect fired application, the pre-purge cycle has the combustion air blower perform the purge function at the maximum speed at which the fan will operate and then reduce the fan's speed for the ignition sequence. After the ignition source is energized, the gas valve is energized. Gas begins to flow into the existing combustion air volume. Initially, the mixture is too lean to ignite initially, but quickly reaches the desired fuel to air ratio for ignition to occur. That momentary delay in reaching the proper mixture for ignition goes unnoticed with indirect fired applications because the mercaptan odor is expelled harmlessly out the vented flue. In direct fired applications, however, even minute amounts of this mercaptan odor may cause personnel to head for the exit. After recognizing this issue, the inventors hereof developed and disclose herein an alternate ignition sequence that minimizes or at least reduces the period during which the lean gas-air ratio delays the ignition of the mixture.

Overcoming both the purge issue and the release of the mercaptan odor are issues that were recognized and addressed by the inventors with their implementation and use of premix technology in direct fired heaters. As disclosed herein (e.g., FIGS. 4 through 6, etc.), exemplary embodiments of a direct fired heater include a damper arrangement that creates an alternate pathway for the discharge air during the purge and ignition cycle. A discharge damper (e.g., 244 in FIG. 5, etc.) is utilized to block the air from flowing out the normal outlet of the heater. A bypass damper (e.g., 248 in FIG. 5, etc.) is held open during the purge and ignition cycle with a pathway similar to a flue on indirect fire products. On rooftop installations, the purged air is expelled out the top of the heater housing and vented to the outdoors. On heaters mounted indoors, the air is directed toward the ceiling where the air is disbursed and diluted to the point where detection is unlikely. After ignition occurs, the two dampers switch positions (e.g., FIG. 6, etc.) permitting normal heater operation to commence.

The inventors hereof also recognized that premix burner technology requires certain controls in order to be optimized in a variety of applications and configurations. The inventors hereof disclose exemplary embodiments of direct fired heaters that use premix burner technology in conjunction with a controller. The controller includes various functions including an ignition system, a modulation system, and a high limit control. Combining these three functions into a single controller helps to optimize or improve the direct fired heating system.

Ignition of a premix burner may be accomplished through use of a pilot, intermittent pilot, spark, or hot surface ignition. During the first few seconds of an ignition attempt, the fuel to air ratio entering the burner may be outside of the ignitable limits of the fuel. After the fuel to air ratio stabilizes and the burner lights, a slight odor of unburned fuel may be detected. To prevent this, the sequence may be modified to start and prove the combustion air blower and then de-energize the combustion air blower. The ignition source would then be energized. And, after a slight delay, the combustion air blower is restarted at the same time the main gas valve is energized.

Modulation of heat output may be used with premix technology to help optimize operation of the system. This heat output modulation may be based on the discharge air temperature leaving the system, inlet air temperature entering the system, or the space temperature being heated. Having the ability to turn down the firing rate of the burner allows the burner to be ignited at a firing rate that is lower than the maximum heat output of the system (low fire start). A modulating control signal can be pulse-width modulation (PWM), 4-20 mA (milliamps), 0-10 VDC (voltage direct current), 0-30 VDC, etc.

In exemplary embodiments, discharge air temperature is used as the feedback for modulation. This includes sampling of the discharge air in a location or locations that accurately represent the average discharge temperature over the entire operating range of the heater. The air that leaves the premix burner mixes with air that did not pass through the burner. Accuracy of the sampling may be improved by increasing this mixing. In exemplary embodiments, the mixing can be increased or improved by forcing the mixed air around turns in the ductwork (e.g., FIGS. 1 through 6, etc.) and/or with baffles, etc.

In other exemplary embodiments, inlet air temperature is used in a feed forward modulating control system. Inlet air does not need to be mixed to give an accurate average temperature. Based on a desired discharge air temperature, the feed forward modulating control system can calculate the theoretical temperature rise required. This temperature rise corresponds to a heat output capacity, and therefore a modulating control output.

In additional exemplary embodiments, the temperature of the space being heated is used for modulation of the premix burner and/or for on/off control (thermostat) of the system. Thermostats may be closed loop, or may communicate over protocols such as wireless internet or Zigbee. These thermostats may also provide local and remote diagnostics. In applications where the air being heated by the premix burner system is taken from the outdoors, a summer ventilation economizer control can be incorporated to provide "smart" cooling by bringing in outside air in the summer time when the outdoor temperature and humidity are lower than the temperature and humidity in the conditioned space.

In addition to modulating heat output, controlling the amount of outside air handled by the system may allow for a constant maximum BTU capacity over a range of design conditions in exemplary embodiments. This adjustment of air volume may be made in the factory or at time of installation, and may be manual and/or automatic. With a large enough adjustment of CFM, the system is controllable to deliver a constant BTU output over the full range of inlet air temperatures, not just at design conditions.

Incorporating premix burner technology into an outdoor air heating system is ideally suited for a number of applications. These include, but are not limited to: retrofit for an existing indirect-fired unit heater, using the existing flue for the outside air, warehouse/distribution centers, car washes, and other harsh environments; door heater, air knife applications, automotive repair facilities, Agricultural (Z83.29); construction site temporary heat (Z83.7), process heat; residential and garage heating, commercial kitchen hoods, and steel storage facilities. In many of these applications, it is undesirable to recirculate contaminated building air through the system. If the air heating system is required to be in a harsh environment, the exterior housing of the heating unit may be plastic, stainless steel, NEMA 4 rated, and/or washdown compatible.

Exemplary embodiments of heaters including premix burner technology may also be further improved or optimized by including one or more (but not necessarily any or all) of the following:

Delivering the outside air in a blow-through arrangement, with the fresh air being handled by a blower completely in the outside air (cold air) stream; and/or.

Space-heating; and/or

Direct-fired; and/or

Certified to Z83.4; and/or

Make-up air in a draw through configuration, with or without multiple burners in a single system; and/or Combustion completed in a tube or duct separating the flame from the air to be heated;

Close-off damper for non-operating times. Damper may be gravity or mechanical, and may be on the inlet and/or the discharge of the system; and/or Variable air volume with the use of a variable frequency drive; and/or Outdoor air blower may be motorized impeller or direct drive forward curved fan, capable of high static pressure; and/or Filters on either the inlet or discharge; and/or Pre-heating of the outside air. This may be accomplished through energy recovery ventilation, solar ducting, etc.; and/or Dual fuel (Natural Gas and Propane); and/or Modular housing design; and/or Air rotation; and/or Air-Conditioning; and/or Tool-less serviceability; and/or A single burner system with multiple/zone discharge options.

Figure 1:
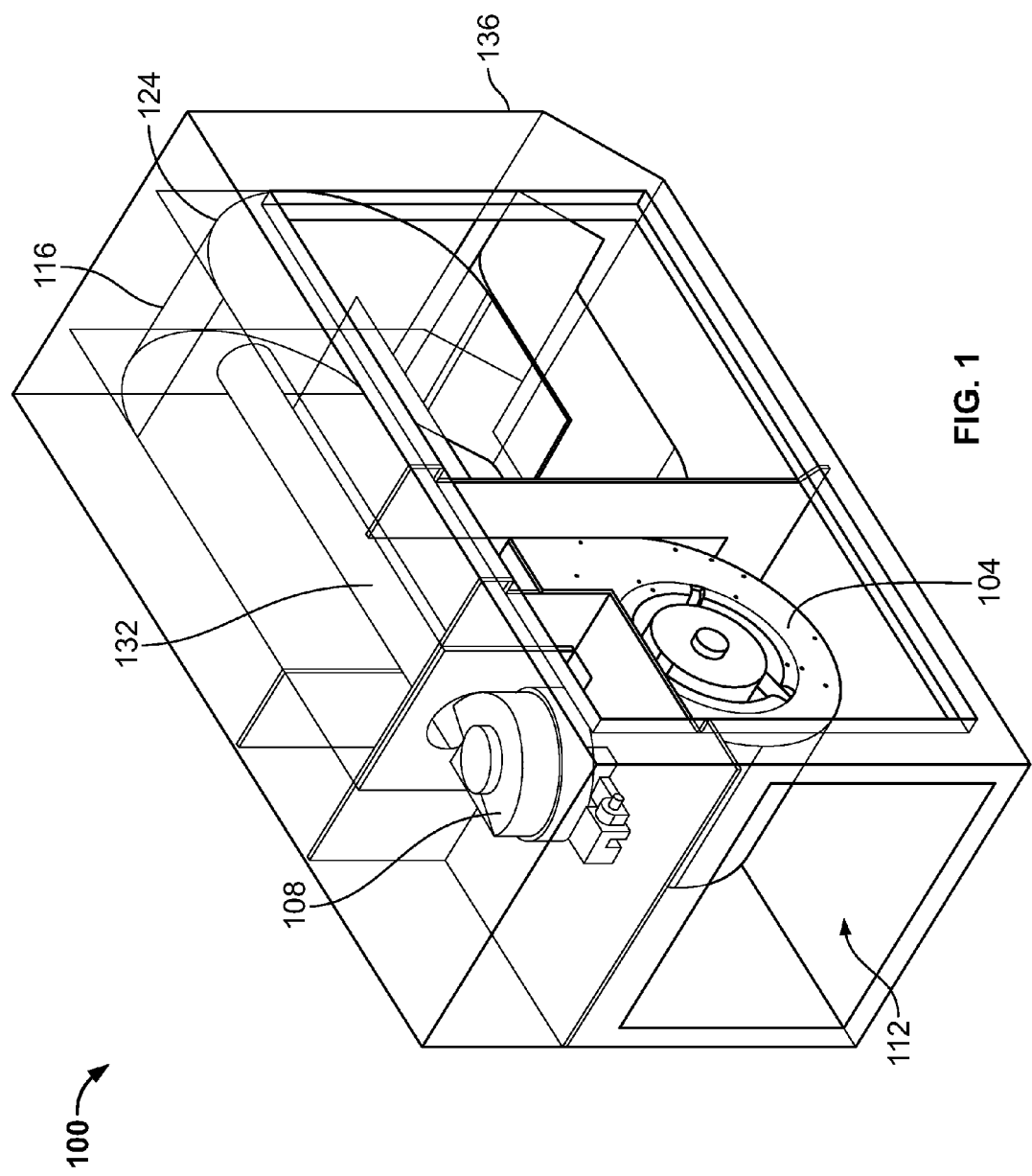
Figure 2:
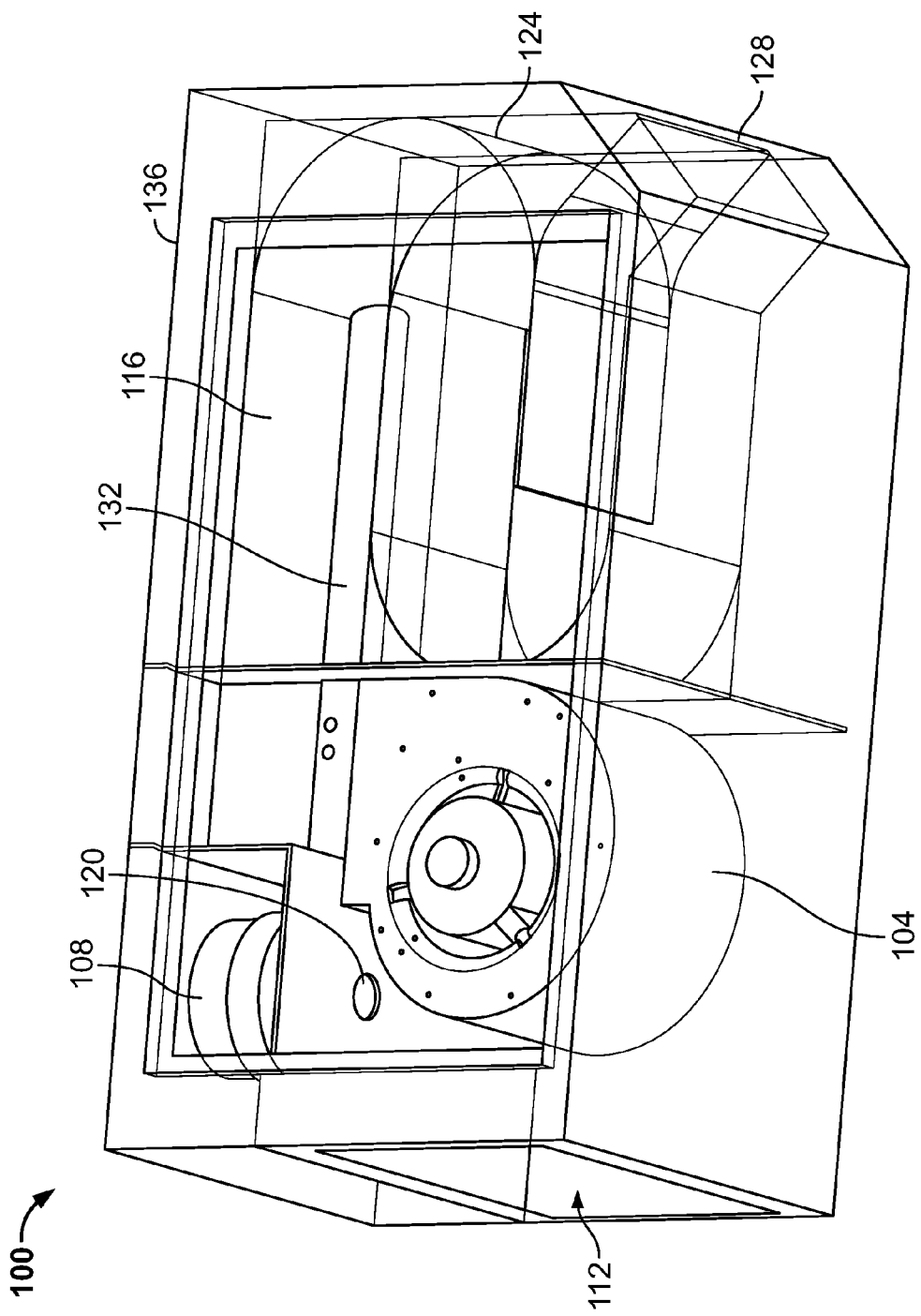
FIG. 2 is a lower perspective view of the direct fired heater shown in FIG. 1.
Figure 3:
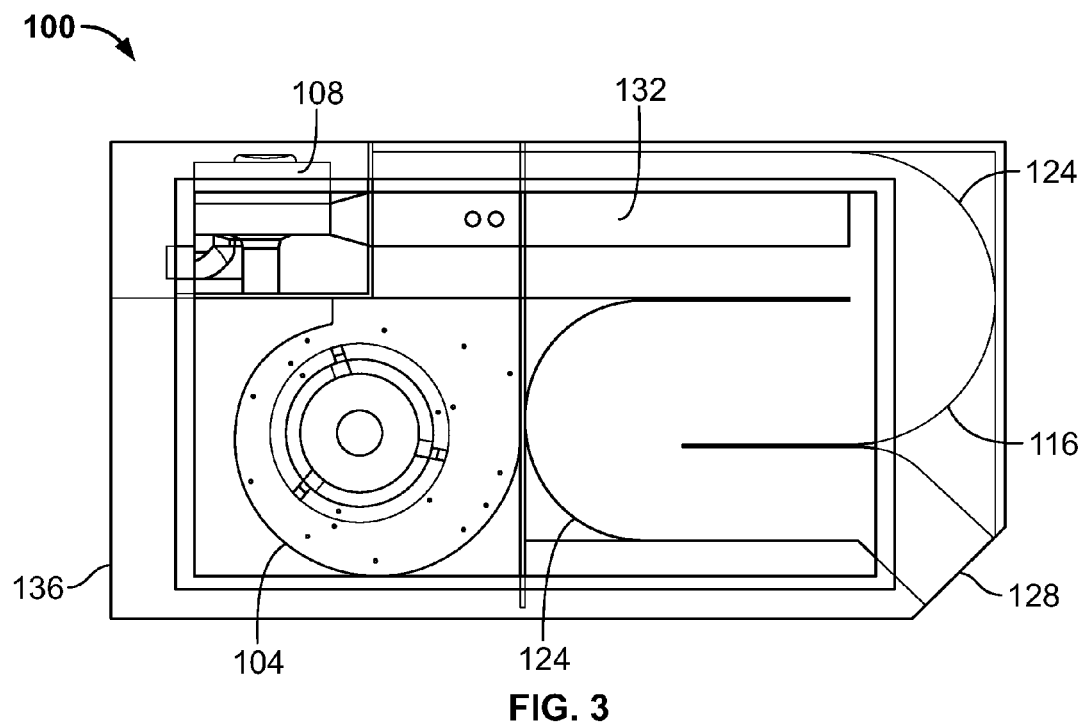
FIG. 3 is a side view of the direct fired heater shown in FIG. 1.

With reference now to the figures, FIGS. 1 through 3 illustrate an exemplary embodiment of a direct fired heater embodying one or more of the various aspects and features disclosed herein. As shown in FIG. 1, the heater 100 includes a primary circulating air blower 104 and a combustion air blower 108. In this example, the primary circulating air blower 104 is upstream of the heater's one or more burners. Accordingly, the direct fired heater 100 in this example has a blow-through heater configuration.

The heater 100 includes an air inlet or opening 112 for the entry of fresh ventilation air. The air inlet 112 may be directly connected to an outside air source. The primary circulating air blower 104 is operable for conveying outside air received via the inlet 112 through the ductwork or ducting 116.

As shown in FIG. 2, there is also an inlet 120 for the entry of air into the combustion air blower 108. The combustion air blower 108 is operable for delivering a combustible gas and air mixture to one or more burner heads. The heater 100 is preferably configured such that combustion air blower 108 provides sufficient air so that all fuel delivered is consumed for complete combustion with a stoichiometric fuel to air ratio.

As shown in FIG. 3, the ductwork 116 includes turns or bends 124, which are operable as a mixing means. In operation, the turns 124 help to blend the temperature of the main air stream as it travels through the ductwork 116 before the air is expelled or discharged from the heater outlet 128 into the confines or space of a building structure to be heated. In this particular example, the ductwork 116 includes two 180 degree turns or curved portions 124 such that the ductwork 116 has a generally S-shaped configuration. Alternative embodiments may include a ductwork more or less than two turns and/or turns configured differently.

The heater 100 may also include an opening, inlet, or pathway that allows a portion of the heated air from the ductwork 116 to be recirculated back to and enter the compartment in which the primary circulating air blower 104 is located. By way of example, the opening, inlet, or pathway may be located relative to the ductwork 116 just after the second turn 124, such that the recirculated air thus travels through both turns 124 (and is well blended and mixed thereby) before the air is recirculated back to the primary circulating air blower compartment. The recirculated portion of the heated air provides preheating of the combustion air before it enters the combustion air blower 108 via inlet 120. In this particular example, the heater 100 may thus have a blow through recirculation configuration.

The heater 100 also includes a fire tube or premix flame separation tube 132. In this example, the fire tube 132 comprises a non-insulated thermally conductive (e.g., metal, etc.) cylinder of sufficient length and diameter to permit all of the fuel-air mixture to be completely consumed before it reaches the end of the firing tube 132. During operation of the heater 100, heat from combustion is absorbed by the walls of the fire tube 132 and transferred to the outside ventilation air stream as it passes alongside of the fire tube 132. With this heat transfer, the fire tube 132 sufficiently cools to remain well below a temperature rating of the tube material. The heat from combustion that is not absorbed by the walls of the fire tube 132 is dispelled out the end of the tube 132 where it is then mixed with the outside ventilation air stream. The heater 100 may also include an observation port for viewing or observing the flame.

To extend the temperature rating of the gas valve and combustion air blower 108 which are part of the premix system in this exemplary embodiment, the heater 100 includes supplemental heat along with means to isolate the gas valve and combustion air blower 108 from the air stream of the main circulating air blower 104. In this exemplary embodiment, the isolation is accomplished by locating the combustion air blower and gas valve assembly in a separate compartment within the heater 100. In addition, a supplementary electric heat source may also be used in conjunction with a thermostatic switch to warm the valve/combustion air blower compartment during non-operational periods and outdoor ambient temperatures below 25° F.

To provide supplementary heat during the heater's operating cycle, the firing tube 132 is configured or modified to include a formed channel. As disclosed herein, the formed channel creates a physical pathway to the gas valve/combustion air blower compartment. During operation, a small portion of the outside ventilation air is propelled or pushed through the channel in a counter flow direction compared to the main system flow. The air is pushed through the channel by static backpressure caused by restricting means provided in the path of the outside ventilation airflow as the air flows through the discharge ductwork to the heater outlet. As air is pushed though the formed channel, the air picks up heat from the fire tube 132 surface and carries it to the gas valve/combustion air blower compartment to thereby provide supplementary heat, which may be based on a worst case outdoor design temperature for the heater 100 whenever the heater 100 is operating.

The formed channel is preferably located in the section or portion of the fire tube 132 where only indirect heat transfer is taking place. Therefore, the air supplied via the channel to the gas valve/combustion air blower chamber is free from any combustion products. Also, the formed channel pathway is preferably sized based on discharge static pressure of the main circulating air blower 104 and the cross sectional area of the formed channel to deliver the volume of combustion air required when the heater is operating at the maximum Btu/hr capacity. In this exemplary embodiment, the premix system modulates the heater capacity to maintain the maximum discharge temperature of 160° F. because less combustion airflow is consumed as the outdoor ambient temperature increases above the outdoor design temperature.

The heater 100 also includes a controller or controls into which various functions may be combined or integrated such as an ignition system, a modulation system, and a high limit control. The modulation system may be operable for modulating heat output based on the discharge air temperature leaving the system, inlet air temperature entering the system, or the space temperature being heated.

In an exemplary embodiment of the heater 100, inlet air temperature is used in a feed forward modulating control system. Inlet air does not need to be mixed to give an accurate average temperature. Based on a desired discharge air temperature, the feed forward modulating control system calculates the theoretical temperature rise required. This temperature rise corresponds to a heat output capacity, and therefore a modulating control output.

In addition to modulating heat output, airflow may also be modulated to allow the gas flow to remain constant despite changes in temperature. Modulating or controlling the amount of outside air handled by the system may allow for a constant maximum BTU capacity over a range of design conditions in exemplary embodiments. With a large enough adjustment of CFM, the heater may be controllable to deliver a constant BTU output over a full range of inlet air temperatures, not just at design conditions.

The direct fired heater 100 includes a gas valve supply assembly, which is in communication with the one or more burners of the direct fired heater 100. In operation, the gas valve supply assembly conveys gas from a utility service line or gas distribution piping that has been routed to the heater 100 for connection to a manual gas supply shut-off valve on the heater 100. The other end of the gas supply assembly is connected to an automatic gas shut-off valve assembly. In an exemplary embodiment, the direct fired heater 100 is a natural gas specific unit in which the fuel type would thus be natural gas for operating the direct fired heater 100. Optionally, a propane conversion kit may also be included to allow the direct fired heater 100 to operate with propane. In another exemplary embodiment, the direct fired heater 100 is a propane specific unit in which the fuel type would thus be propane for operating the direct fired heater.

In this exemplary embodiment shown in FIG. 1 through 3, a bulkhead separates the blowers 104, 108 from a controls section or compartment of the cabinet 136. The one or more burner head of heater 100 are preferably located on an opposite side of the bulkhead than the combustion air blower 108. The bulkhead separates the gas valve assembly and the combustion air fan assembly compartment from the outside ventilation air compartment and the outlet ducting section of the heater 100. The one or more burner heads are preferably configured to impart a swirling pattern to the fuel-air mixture as the mixture passes through a membrane of the burner head(s) into the firing tube 132. Ignition of the fuel-air mixture and flame presence may be continually monitored by a flame safeguard control system by utilizing a flame detection sensor throughout the heating cycle.

The direct fired heater 100 also includes a discharge bevel. Side sheets are added to the ductwork 116 to give the appearance of flat pieces with the curves 124 sandwiched between. The blowers 104, 108 and ductwork 116 have been configured to achieve a reduced and relatively small cabinet size. In this example, the cabinet construction includes a pan, a 3-sided wrap, and a removable top panel. The assembly is with LP screws. The cabinet also includes a door that covers the blower compartment, which door is attached with screws to help support the bulkhead. The cabinet also includes a controls door that covers the controls section or compartment, which controls door will be secured with a conventional M-series X-turn lock in this example.

Figure 5:
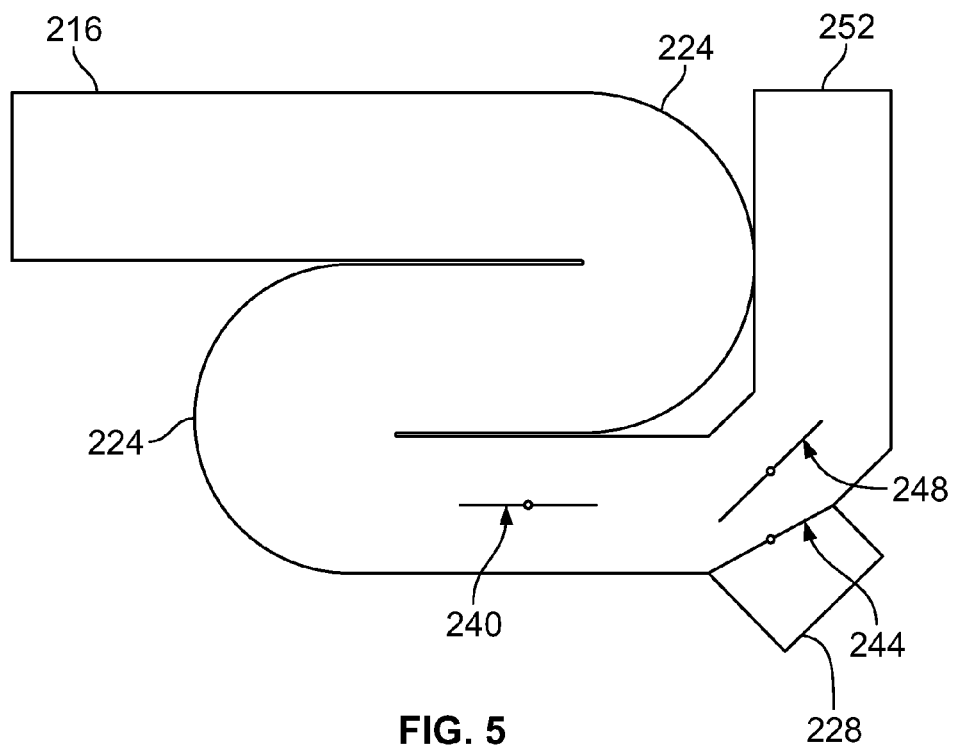
FIG. 5 is a side view of the ductwork and dampers of FIG. 4 where the dampers are shown in a bypass mode in which the discharge damper is closed but the primary and bypass dampers are open whereby air would be redirected during the fresh air purge and ignition cycle of a direct fired heater to avoid cold drafts and gas odor on startup.

FIGS. 4 through 6 illustrate an exemplary embodiment of ductwork 216 and dampers 240, 244, 248 embodying one or more aspects of the present disclosure. The ductwork 216 and dampers 240, 244, 248 may be used in a direct fired heater (e.g., 100, etc.) for redirecting air during the fresh air purge and ignition cycle to avoid cold drafts and gas odor on startup according to exemplary embodiments. In FIG. 4, the dampers 240, 244, and 248 are all shown in a heater off mode in which the dampers 240, 244, and 248 are all closed.

In FIG. 5, the dampers 240, 244, 248 are shown in a bypass mode in which the discharge damper 244 is closed but the primary and bypass dampers 240, 248 are open. In this bypass configuration, air traveling through the ductwork 216 will pass the open primary damper 240. But the closed discharge damper 244 will block the air from being discharged out the outlet 228 into the space to be heated. Instead, the air is redirected and passes the open bypass damper 248. The purged air is then expelled out the bypass vent or outlet 252, where it may be vented to the outdoors, etc. Advantageously, the dampers 240, 244, 248 thus allow the air to be redirected during the fresh air purge and ignition cycle of a direct fired heater to avoid cold drafts and gas odor on startup.

In FIG. 6, the dampers 240, 244, 248 are shown in a discharge mode in which the bypass damper 248 is closed but the primary and discharge dampers 240, 244 are open. In this discharge configuration, air traveling through the ductwork 216 will pass the open primary damper 240. But the closed bypass damper 248 will block the air from being discharged out the bypass vent or outlet 252. Instead, air will pass the open discharge damper 244 and be discharged from the outlet 228 into the space to be heated.

The ductwork 216 includes turns or bends 224, which are operable as a mixing means. In operation, the turns 224 help to blend the temperature of the main air stream as it travels through the ductwork 216 before the air is expelled or discharged from the heater outlet 228 into the confines or space of a building structure to be heated. In this particular example, the ductwork 216 includes two 180 degree turns or curved portions 224 such that the ductwork 216 has a generally S-shaped configuration. Alternative embodiments may include a ductwork with more or less than two turns and/or turns configured differently.

FIG. 7 illustrates another exemplary embodiment of direct fired heater 300 embodying one or more aspects of the present disclosure. As shown, the direct fired heater 300 has a generally linear tubular design. The direct fired heater 300 includes mixing means 356 configured (e.g., sized, shaped, located, etc.) to blend the temperature as circulating air passes through the ductwork 316, which in this example includes a generally linear or straight tube having a bypass vent or outlet 352. Also shown in FIG. 7 are a rain hood 360, an inline fan 304, a combustion air blower 308, and a fire tube 332 with preheat channel.

The direct fired heater 300 also includes a discharge damper 344 and a bypass damper 348. In FIG. 7, the direct fired heater 300 is shown operating in a discharge mode in which the bypass damper 348 is closed and the discharge damper 344 is open. In the discharge mode, the closed bypass damper 348 blocks air from the bypass vent or outlet 352, and the air will pass the open discharged damper 344 and be discharged via the outlet 328 to the space to be heated. During the fresh air purge and ignition cycle, the positions of the dampers 344, 348 would be reversed for a bypass mode. In the bypass mode, the bypass damper 348 is open, and the discharge damper 344 is closed so that unheated, cold fresh air and unignited gas cannot the space to be heated but is vented or discharged via the bypass vent or outlet 352.

In this exemplary embodiment, the direct fired heater 300 also includes a camera 364 and a view screen 368 for flame observation. The camera 364 is remote from the view screen 368, but may be connected via fiber optics. In operation, the camera 364 and view screen 368 allow for easy observation of the igniter and major portion of the flame of the direct fired heater 300. The camera 364 and view screen 368 allow flame observation in this tube heater design even when the direct fired heater 300 is mounted on a roof. Without the camera 364 and view screen 368, it would be difficult to service a unit on a roof while at the same time being under the roof looking into the fire tube to see the igniter and observe the flame inside the tube.

When the direct fired heater 300 is in operation, the camera 364 may also help to blend the temperature as circulating air passes through the ductwork 316. In which case, the camera 364 may comprise the mixing means (or portion thereof). Additionally, or alternatively, a separate structure (e.g., baffle 356, etc.) may be provided within the duct 316 to operate as the mixing means that blends the temperature as circulating air passes through the ductwork 316. The camera 364 may be mounted to the mixing means/separate structure or other mounting surface.

In exemplary embodiments, a direct fired heater (e.g., direct fired heater 100, 300, or other direct fired heater) is used to replace an indirect fired heater in packaged heating/air conditioning equipment. More specifically, a packaged HVAC unit has a large circulating air blower that delivers heated and air conditioned air through a duct system. Normally, the duct furnaces would be mounted on the discharge side of the blower. The inventors hereof have developed an innovative approach in which a direct fired heater (e.g., direct fired heater 100, 300, or other direct fired heater) is arranged such that the direct fired heater's outlet feeds the inlet or suction side of the blower of the packaged HVAC unit. In addition, some HVAC packaged units use electric heat distribution boxes downstream of the main ductwork in the individual branches. Because electric heat is expensive, the inventors innovative approach also includes using direct fired heaters (e.g., direct fired heater 100, 300, or other direct fired heater) with HVAC packaged units.

Exemplary embodiments of direct fired heaters disclosed herein may be provided or configured in various sizes and with various firing rates. For example, an exemplary embodiment of a direct fired heater disclosed herein may be provided or offered in three different sizes each with multiple (e.g., two, three, etc.) firing rates, and which use 100% outside air. The three differently sized direct fired heaters may be operable to cover three different ranges, such as a first range 100,000 Btu/hr (British thermal units per hour) to 150,00 Btu/hr, a second range 200,000 Btu/hr to 250,00 Btu/hr, and a third range 300,000 Btu/hr to 400,00 Btu/hr. Alternative embodiments may include a larger or smaller direct fired heater.

Exemplary direct fired heaters disclosed herein may be used in a wide range of applications. For example, the inventors' direct fired heaters may be used for space heating of open spaces, such as garages, vestibules in retail areas, small warehouses, manufacturing facilities, other commercial and industrial spaces, industrial strip manufacturing plaza, small warehouses and storage areas, automotive repair shops, indoor recreational facilities, parking garages, small commercial/industrial buildings with high ceilings and open floor plans, 5,000 to 50,000 square feet buildings, etc.). By way of further example, the inventors' direct fired heaters may be used for make-up air/ventilation, process applications (e.g., bake ovens, conveyor systems, etc.), agricultural heaters, construction heaters, integrated or used with packaged HVAC units, retrofit applications as a replacement for existing low efficiency vented unit heaters, office building or residential heating and fresh air ventilation and economizer mode cooling, 100% outside air or recirculation, radon gas removal, addresses residential depressurization issues, etc. Accordingly, the exemplary embodiments of direct fired heaters disclosed herein should not be limited to any particular end use or application.

Additionally, aspects of the present disclosure are not necessarily limited to direct gas-fired blow-through heaters. For example, one or more aspects (e.g., premix burner technology, camera, fiber optics, and view screen, feed forward control loop, etc.) of the present disclosure may be used with other heater configurations, such as direct fired draw-through heaters, heaters that are both direct and indirect fired, etc.

Exemplary embodiments of a direct fired heater disclosed herein may be configured to include one or more (but not necessarily any or all) of the following features:
 direct fired heat technology utilizing premix burner combustion, and an outside ventilation air delivery system configured upstream of the burner(s) (blow through configuration); and/or
 processing or using 100% outside air; and/or
 direct fired heat technology utilizing premix burner combustion with an outside air blower processing a combination of inside and outside air and configured upstream of the burner(s) (blow through recirculation configuration); and/or
 feed forward control loop; and/or
 preheating of combustion air; and/or
 constant BTU (field configurable and/or automated); and/or
 premix flame separation tube; and/or
 temperature control of discharge temperature with premix; and/or
 multiple burners for make-up air applications; and/or
 hot surface ignition for premix; and/or
 integration with packaged HVAC units; and/or
 bent tube with observation port; and/or
 remote camera/fiber optics for flame observation; and/or
 air mixing chamber for temperature mixing.

Exemplary embodiments of a direct fired heater that include premix burner combustion technology may be configured to include or have one or more (but not necessarily any or all) of the following features:
 clean combustion; and/or
 separated combustion without additional Oxygen sources until after combustion is completed; and/or
 straight fire tube; and/or
 bent fire tube w/observation; and/or
 finned fire tube
 premix with blow through and/or with draw through; and/or
 perfect stoichiometric fuel to air ratio over range of operating conditions; and/or
 premix with recirculation; and/or
 premix with air rotation; and/or
 premix with cooling; and/or
 premix with discharge temperature control; and/or
 premix with solar duct; and/or
 premix with energy recovery; and/or
 tubular (flame separation) technology for flame separation; and/or
 preheat of combustion air from fire tube.

Exemplary embodiments of a direct fired heater include controls, which may be configured to include or have one or more (but not necessarily any or all) of the following features:
 feed forward control loop modulation via inlet temperature that:
  that eliminates overshooting of discharge temperature; and/or
  that allows for rapid achievement of desired discharge temperature; and/or
  improves efficiency during start-up cycle; and/or
 modulation via space temperature and discharge temperature; and/or
 modulation of fuel to air ratio via a reliable zero governor regulator; and/or
 constant BTU—field configurable; and/or
 constant BTU—automated.

The exemplary embodiments of a direct fired heater disclosed herein may have different configurations, such as a blow through or draw through configuration. Mounting options for a direct fired heater may include indoor, outdoor, under roof, through wall, and/or roof top. An exemplary embodiment of a direct fired heater may include one or more of: a wedge design allowing for a convertible inlet; air temperature mixing through multiple turns of a ductwork; air temperature mixing with baffles; and/or a tube design with air mixing (counter-flow of air versus flame) and remote flame observation via camera and fiber optics.

Exemplary embodiments of a direct fired heater disclosed herein may be configured such that they are associated with, include, allow, or provide one or more (but not necessarily any or all) benefits including energy efficiency (e.g., 92% efficiency, etc.) direct gas-fired heater, fresh air ventilation, compliance with SCAQMD Rule 1147 and have NOx results below 30 ppm at 3% $O_2$, low installation costs, and/or low maintenance costs.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purpose of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally," "about," and "substantially," may be used herein to mean within manufacturing tolerances. Or for example, the term "about" as used herein when modifying a quantity of an ingredient or reactant of the invention or employed refers to variation in the numerical quantity that can happen through typical measuring and handling procedures used, for example, when making concentrates or solutions in the real world through inadvertent error in these procedures; through differences in the manufacture, source, or purity of the ingredients employed to make the compositions or carry out the methods; and the like. The term "about" also encompasses amounts that differ due to different equilibrium conditions for a composition resulting from a particular initial mixture. Whether or not modified by the term "about," the claims include equivalents to the quantities.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A direct fired heater comprising:
   one or more premix burners;
   one or more combustion blowers operable for delivering a combustible mixture of air and gas to the one or more premix burners;
   an outside air delivery system upstream of the one or more premix burners;
   an ignition system;
   a modulation system operable for modulating heat output based on discharge air temperature, inlet air temperature, or a temperature of a space being heated by the direct fired heater, wherein the modulation system is a feed forward modulating control system operable for controlling heat output such that heat output modulation is based on inlet air temperature;
a high limit control; and
a single controller operable for controlling the ignition system, the modulation system, and the high limit control;
wherein the outside air delivery system comprises an outside air blower upstream of the one or more premix burners and operable for processing a combination of inside and outside air; and/or
wherein the direct fired heater is configured to use 100% outside air.

2. A direct fired heater comprising:
one or more premix burners;
one or more combustion blowers operable for delivering a combustible mixture of air and gas to the one or more premix burners;
an outside air delivery system upstream of the one or more premix burners;
an ignition system;
a modulation system operable for modulating heat output based on discharge air temperature, inlet air temperature, or a temperature of a space being heated by the direct fired heater;
a high limit control;
a single controller operable for controlling the ignition system, the modulation system, and the high limit control;
wherein the outside air delivery system comprises an outside air blower upstream of the one or more premix burners and operable for processing a combination of inside and outside air, and/or the direct fired heater is configured to use 100% outside air;
wherein:
the one or more combustion air blowers and one or more gas valve assemblies are in a separate compartment from the outside air blower; and
an electric heater is operable for warming the separate compartment during non operational periods and when an outdoor ambient temperature is below a predetermined temperature, whereby a temperature rating of the one or more gas valve assemblies and the one or more combustion blowers may be extended.

3. The direct fired heater of claim 2, wherein the modulation system is a feed forward modulating control system operable for controlling heat output such that heat output modulation is based on inlet air temperature.

4. A direct fired heater comprising:
one or more premix burners;
one or more combustion blowers operable for delivering a combustible mixture of air and gas to the one or more premix burners;
an outside air delivery system upstream of the one or more premix burners;
an ignition system;
a modulation system operable for modulating heat output based on discharge air temperature, inlet air temperature, or a temperature of a space being heated by the direct fired heater;
a high limit control;
a single controller operable for controlling the ignition system, the modulation system, and the high limit control; and
a flame separation tube having a channel that creates a pathway to a gas valve/combustion blower compartment, whereby during operation, a portion of the outside air is pushed through the channel in a counter flow direction compared to a main air stream, absorbs heat from a flame separation tube surface, and carries the heat to the gas valve/combustion blower compartment to thereby provide supplementary heat to extend a temperature rating of the gas valve and combustion blower;
wherein the outside air delivery system comprises an outside air blower upstream of the one or more premix burners and operable for processing a combination of inside and outside air; and/or
wherein the direct fired heater is configured to use 100% outside air.

5. The direct fired heater of claim 1, wherein:
one or more flame separation tubes have a sufficient length and diameter to permit all of the combustible mixture having a stoichiometric fuel to air ratio over a range of operating conditions to be completely consumed before the flame reaches the end of the flame separation tube(s) thereby producing emissions considered to be low Nox.

6. The direct fired heater of claim 1, wherein the direct fired heater is configured such that combustion air is preheated via an electric heater and/or a channel.

7. A direct fired heater comprising:
one or more premix burners;
one or more combustion blowers operable for delivering a combustible mixture of air and gas to the one or more premix burners;
an outside air delivery system upstream of the one or more premix burners;
an ignition system;
a modulation system operable for modulating heat output based on discharge air temperature, inlet air temperature, or a temperature of a space being heated by the direct fired heater;
a high limit control;
a single controller operable for controlling the ignition system, the modulation system, and the high limit control; and
an opening in a discharge ductwork and a gas valve/combustion blower compartment with a pathway that carries a portion of heated air from the discharge ductwork to be recirculated for warming the gas valve/combustion blower compartment during heater operation to extend the temperature range of the gas valve and combustion blower;
wherein the outside air delivery system comprises an outside air blower upstream of the one or more premix burners and operable for processing a combination of inside and outside air; and/or
wherein the direct fired heater is configured to use 100% outside air.

8. The direct fired heater of claim 1, further comprising mixing means for discharge temperature control and blending temperature of a heated air stream before it is discharged from an outlet of the heater.

9. The direct fired heater of claim 1, wherein the direct fired heater includes:
a discharge ductwork having one or more turns;
an inlet air opening for entry of outside air from an outside air source; and
an outside air blower operable for conveying outside air through the discharge ductwork in which an outside air stream absorbs heat generated from an air stream heated by the one or more premix burners;
wherein the one or more turns of the discharge ductwork are operable for helping to blend a temperature of the outside air stream and/or to mix the heat from combustion with the outside air stream when travelling through the one or more turns.

10. The direct fired heater of claim 1, wherein one or more gas valve assemblies include a zero governor regulator set to control a flow of gas in response to a speed of the one or more combustion blowers.

11. The direct fired heater of claim 1, further comprising a flame separation or fire tube for each premix burner utilized in the heater, wherein the tube is non-insulated and thermally conductive, whereby during operation:
the length and diameter of the flame separation tube permits all of the fuel air mixture to be completely consumed;
at least a portion of the heat from combustion is absorbed by walls of the tube and transferred to the main air stream as it passes alongside of the tube such that the tube sufficiently cools to remain below a temperature rating of the tube material; and
a remaining portion of the heat from combustion not absorbed by the walls of the tube is dispelled out an end of the tube where it is mixed with the main air stream.

12. The direct fired heater of claim 1, further comprising a bypass damper and a discharge damper that are operable for creating an alternate pathway for discharged air during a purge and ignition cycle of the direct fired heater.

13. A direct fired heater comprising:
one or more premix burners;
one or more combustion blowers operable for delivering a combustible mixture of air and gas to the one or more premix burners;
an outside air delivery system upstream of the one or more premix burners;
an ignition system;
a modulation system operable for modulating heat output based on discharge air temperature, inlet air temperature, or a temperature of a space being heated by the direct fired heater;
a high limit control;
a single controller operable for controlling the ignition system, the modulation system, and the high limit control;
wherein the direct fired heater is configured to allow airflow to be controlled or modulated such that gas flow remains constant despite changes in outdoor ambient temperature and such that the direct fired heater is controllable to deliver a constant BTU output over a range of inlet air temperatures, whereby adjustment of airflow is field configurable and/or automated; and
wherein the outside air delivery system comprises an outside air blower upstream of the one or more premix burners and operable for processing a combination of inside and outside air, and/or the direct fired heater is configured to use 100% outside air.

14. The direct fired heater of claim 1, further comprising a camera for flame observation.

15. The direct fired heater of claim 1, wherein the direct fired heater includes one or more flame separation tubes having a sufficient length and diameter to produce NOx results below 30 ppm at 3% $O_2$.

16. A packaged HVAC system comprising a blower and a direct fired heater, the direct fired heater comprising:
an outlet arranged to feed an inlet or suction side of the packaged HVAC system blower;
one or more premix burners;
one or more combustion blowers operable for delivering a combustible mixture of air and gas to the one or more premix burners;
an outside air delivery system upstream of the one or more premix burners;
an ignition system;
a modulation system operable for modulating heat output based on discharge air temperature, inlet air temperature, or a temperature of a space being heated by the direct fired heater, wherein the modulation system is a feed forward modulating control system operable for controlling heat output such that heat output modulation is based on inlet air temperature;
a high limit control; and
a single controller operable for controlling the ignition system, the modulation system, and the high limit control;
wherein the outside air delivery system comprises an outside air blower upstream of the one or more premix burners and operable for processing a combination of inside and outside air; and/or
wherein the direct fired heater is configured to use 100% outside air.

17. The packaged HVAC system of claim 16, further comprising a controller operable for controlling the ignition system, the modulation system, and the high limit control.

18. The packaged HVAC system of claim 16, wherein:
the one or more combustion blowers and one or more gas valve assemblies are in a separate compartment from the outside air delivery system; and
an electric heater is operable for warming the separate compartment during non-operational periods and when an outdoor ambient temperature is below a predetermined temperature, whereby a temperature rating of the one or more gas valve assemblies and the one or more combustion blowers may be extended.

19. The packaged HVAC system of claim 16, further comprising a flame separation tube having a channel that creates a pathway to a gas valve/combustion blower compartment, whereby during operation, a portion of the outside air is pushed through the channel in a counter flow direction compared to a main air stream, absorbs heat from a flame separation tube surface, and carries the heated air to the gas valve/combustion blower compartment to thereby provide supplementary heat to extend the temperature range of a gas valve and the combustion blower.

20. The packaged HVAC system of claim 16, wherein:
one or more flame separation tubes have a sufficient length and diameter to permit all of the combustible mixture having a stoichiometric fuel to air ratio over a range of operating conditions to be completely consumed before the flame reaches the end of the flame separation tube(s) thereby producing emissions considered to be low NOx.

21. The packaged HVAC system of claim 16, wherein the direct fired heater is configured such that combustion air is preheated via an electric heater and/or a channel.

22. The packaged HVAC system of claim 16, further comprising an opening in a discharge ductwork and a gas valve/combustion blower compartment with a pathway that carries a portion of heated air from the discharge ductwork to be recirculated for warming the gas valve/combustion blower compartment during heater operation to extend the temperature range of a gas valve and the combustion blower.

23. The packaged HVAC system of claim 16, further comprising mixing means for discharge temperature control and blending temperature of a heated air stream before it is discharged from an outlet of the heater.

24. The packaged HVAC system of claim 16, wherein the direct fired heater includes:
a discharge ductwork having one or more turns;
an inlet air opening for entry of outside air from an outside air source; and
an outside air blower operable for conveying outside air through the discharge ductwork in which an outside air stream absorbs heat generated from an air stream heated by the one or more premix burners;
wherein the one or more turns of the discharge ductwork are operable for helping to blend a temperature of the outside air stream and/or to mix the heat from combustion with the outside air stream when travelling through the one or more turns.

25. The packaged HVAC system of claim 16, wherein one or more gas valve assemblies include a zero governor regulator set to control a flow of gas in response to a speed of the one or more combustion blowers.

26. The packaged HVAC system of claim 16, further comprising a flame separation or fire tube for each premix burner utilized in the heater, wherein the tube is non-insulated and thermally conductive, whereby during operation:
the length and diameter of the flame separation tube permits all of the fuel air mixture to be completely consumed;
at least a portion of the heat from combustion is absorbed by walls of the tube and transferred to the main air stream as it passes alongside of the tube such that the tube sufficiently cools to remain below a temperature rating of the tube material; and
a remaining portion of the heat from combustion not absorbed by the walls of the tube is dispelled out an end of the tube where it is mixed with the main air stream.

27. The packaged HVAC system of claim 16, further comprising a bypass damper and a discharge damper that are operable for creating an alternate pathway for discharged air during a purge and ignition cycle of the direct fired heater.

28. The packaged HVAC system of claim 16, wherein the direct fired heater is configured to allow airflow to be controlled or modulated such that gas flow remains constant despite changes in outdoor ambient temperature and such that the direct fired heater is controllable to deliver a constant BTU output over a range of inlet air temperatures, whereby adjustment of airflow is field configurable and/or automated.

29. The packaged HVAC system of claim 16, further comprising a camera for flame observation.

30. The packaged HVAC system of claim 16, wherein the direct fired heater includes one or more flame separation tubes having a sufficient length and diameter to produce NOx results below 30 ppm at 3% $O_2$.

31. A direct fired heater comprising:
one or more premix burners;
a gas valve assembly;
one or more premix combustion air blowers operable for delivering a combustible mixture of air and gas to the one or more premix burners, the one or more premix combustion air blowers and the gas valve assembly are in a separate compartment from a fresh air blower of the direct fired heater;
an outside ventilation air delivery system upstream of the one or more premix burners;
a feed forward modulating control system operable for controlling heat output such that heat output modulation is based on inlet air temperature;
an electric heater operable for warming the separate compartment having the one or more premix combustion air blowers therein; and
a fire tube having a channel that creates a pathway to the gas valve/combustion air blower compartment, whereby during operation, a portion of the outside ventilation air is pushed through the channel in a counter flow direction compared to a main air flow, absorbs heat from a fire tube surface, and carries the heat to the gas valve/combustion air blower compartment to thereby provide supplementary heat.

32. A direct fired heater comprising:
one or more premix burners;
one or more premix combustion air blowers operable for delivering a combustible mixture of air and gas to the one or more premix burners;
an outside ventilation air delivery system upstream of the one or more premix burners;
an ignition system;
a modulation system operable for modulating heat output based on discharge air temperature, inlet air temperature, or a temperature of a space being heated by the direct fired heater;
a high limit control; and
a single controller operable for controlling the ignition system, the modulation system, and the high limit control;
wherein the outside ventilation air delivery system comprises an outside air blower upstream of the one or more premix burners and operable for processing a combination of inside and outside air and/or wherein the direct fired heater is configured to use 100% outside air;
wherein the one or more premix combustion air blowers and a gas valve assembly are in a separate compartment from a fresh air blower; and
wherein an electric heater is operable for warming the separate compartment during non-operational periods and outdoor ambient temperatures below a predetermined temperature, whereby a temperature rating of the gas valve assembly and the one or more premix combustion air blowers may be extended.

33. A direct fired heater comprising:
one or more premix burners;
one or more premix combustion air blowers operable for delivering a combustible mixture of air and gas to the one or more premix burners;
an outside ventilation air delivery system upstream of the one or more premix burners;
an ignition system;
a modulation system operable for modulating heat output based on discharge air temperature, inlet air temperature, or a temperature of a space being heated by the direct fired heater;
a high limit control; and
a single controller operable for controlling the ignition system, the modulation system, and the high limit control;
wherein the outside ventilation air delivery system comprises an outside air blower upstream of the one or more premix burners and operable for processing a combination of inside and outside air and/or wherein the direct fired heater is configured to use 100% outside air; and
wherein the direct fired heater is configured to allow airflow to be controlled or modulated such that gas flow may remain constant despite changes in temperature and such that the direct fired heater is controllable to deliver a constant BTU output over a range of inlet air temperatures, whereby adjustment of airflow may be field configurable and/or automated.

\* \* \* \* \*